Nov. 24, 1959
C. C. ANTHES
2,914,344
QUICK DETACHABLE SAFETY CONNECTION BETWEEN
BLOWPIPE BODY AND STEM
Filed April 6, 1955
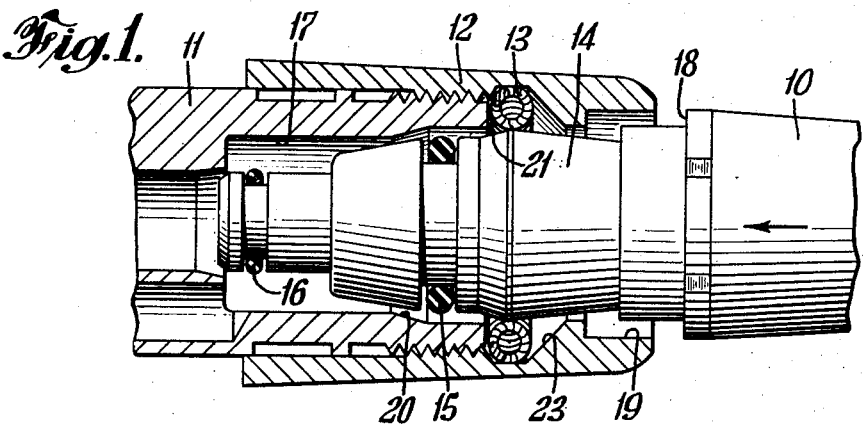
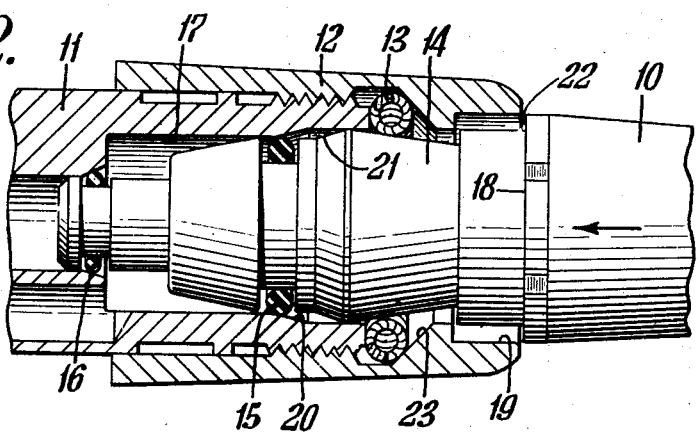
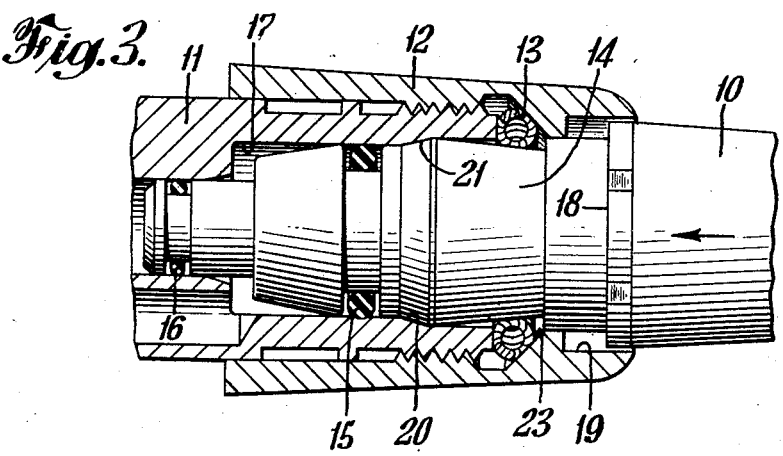
INVENTOR
CLIFFORD C. ANTHES
BY
William F. Mesinger
ATTORNEY

United States Patent Office 2,914,344
Patented Nov. 24, 1959

2,914,344

QUICK DETACHABLE SAFETY CONNECTION BETWEEN BLOWPIPE BODY AND STEM

Clifford C. Anthes, Union, N.J., assignor to Union Carbide Corporation, a corporation of New York Application April 6, 1955, Serial No. 499,683

3 Claims. (Cl. 285—93)

This invention relates to a blowpipe of the type having a removable welding head assembly or stem with nozzle insertable within and held within a blowpipe body by a quick detachable connection. An object is to provide a blowpipe in which a removable stem is capable of being locked in position in advance of the stem reaching its fully inserted position, so that it may not be blown outward in event of an accidental backfire. Another object is to provide such a blowpipe in which an operator may sense a lockable position by the feel or increase in friction resulting from O ring packings sliding within their recesses in the blowpipe body. A further object is to provide such a blowpipe having the stem lockable in advance of its reaching an abutment or stop within the body portion. Yet another object is to provide a blowpipe in which a visual signal confirms the feel of the stem having reached a lockable position. Still another object is to provide a blowpipe having a toroidal spring type of quick detachable connection in which such spring is carried by the body portion of such a blowpipe in unlocked position without danger of such spring rattling.

Referring to the drawings Fig. 1 is a longitudinal section through the blowpipe body portion showing a stem just before it reaches a lockable position.

Fig. 2 shows the stem after it has reached a preliminary lockable position.

Fig. 3 shows a stem in fully inserted position.

A welding head assembly or stem 10 in Fig. 1 is shown being inserted within the blowpipe body 11. A locking nut 12 is threaded on the outside of the body 11 and carries an internal recess of the type illustrated in which is a toroidal spring 13. In unlocked or detached position the spring is expanded into contact with the radially outer base of this internal groove in the nut 12 so that the spring does not rattle or feel loose. The stem 10 is provided with a ramp or tapered locking surface 14 of the general shape illustrated so that after the stem has been moved within the body portion 11 any further distance than that illustrated in Fig. 1 the toroidal spring 13 may be compressed or moved radially inward into contact with the locking surface 14 and prevent the stem being withdrawn. Such a position is illustrated in Fig. 2.

A pair of O ring packings are provided on the stem as illustrated, the larger one 15 and the smaller one 16 being positioned within stem grooves as shown. The body portion 11 of the blowpipe is provided with cylindrical recesses in which these packing rings have a sliding fit, the recess of larger diameter is indicated by the numeral 17 and that of the smaller diameter is unnumbered. The entrances to these cylindrical recesses are slightly tapered as illustrated to facilitate entry of the packing rings and stem portion carrying them. A shoulder 18 on the stem is so positioned that after the O rings have reached a gastight position such shoulder is received within the outer end of the locking nut 12 and within the recess or socket 19. The bevelled entrance 20 to the recess 17 constitutes an abutment for engagement by the complementary bevelled abutment portion 21 when the stem has been fully inserted. The gap 22 between the shoulder 18 and the outer end of the locking nut 12 indicates that the stem has not yet been inserted as fully as is desired for a safe gas-tight position.

Fig. 3 shows the stem in its fully received position in which the abutment surfaces 20 and 21 are in contact, the O ring packings are each fully within the cylindrical recess, and the gap 22 has been eliminated. Immediately in front of the shoulder 18 is a generally polygonal portion which is fully received within the locking nut 12 as shown in Fig. 3 and the reception of the entire part of such polygonal portion constitutes another visual signal indicating the stem has been received fully within the body portion.

In assembling, the operator inserts the stem into the body portion until the feel exerted by frictional resistance of the O rings entering their recesses indicates to the operator that a substantially gas-tight position has been reached at which time the nut 12 is rotated to force the spring 13 against the locking surface 14 by the cam action of the surface 23 of the locking nut forcing the spring 13 against the forward end of the body 11 and radially inward against the locking surface 14. The absence, or substantial absence of the gap 22 confirms the fact that the stem has reached a preliminary position of lockability. As the stem is further pushed into the body 11 the nut 12 is preferably rotated simultaneously with such inward movement to further retain the stem against being blown outward in case of a backfire or high pressure wave within the blowpipe body. After the spring 13 has passed the ridge between the tapered surfaces 14 and 21 it may be locked in any position against the surface 14 for retaining the stem against being withdrawn. In any position of lockability the cam surface 23, pressing on one portion of the toroidal spring 13, holds it contiguous a forward end of the body and a chord between the points of tangency, for the spring in a locking position, passes above the axial center of the spring.

Among the advantages of this invention may be mentioned the possibility of determining a locking position entirely by feel which sense may be confirmed by sight. The fact that the shoulder 18 referred to is within the locking nut is a visual indication of the removable element being in a position for lockability. The removable stem unit is capable of being locked against coming out before it reaches a sealing position, therefore, giving added indication of locking when sealing is attained. The toroidal spring is easier to operate and has a longer life than a solid spring. The long locking surface 14 provides lockability over a fairly wide range of positions. In this particular blowpipe the fuel gas is fed into the axial center passageway not shown, and oxidizing gas or oxygen passages are radially outside it. This blowpipe also has the stem capable of being locked against withdrawal well before it reaches the inner extremity of its inward travel. In fact as shown in Figs. 1 and 2 this removable male element may be locked against withdrawal in advance of its having obtained a complete gas sealing position.

This application is a continuation-in-part of my prior application Serial No. 427,329, filed May 3, 1954, and now abandoned, for Quick Detachable Connection.

I claim:

1. In a blowpipe having a body portion, a removable stem, a quick detachable connection between said body portion and stem, the stem having cylindrical portions of differing diameters on which are spaced O ring packings for cooperation with cylindrical recesses of different sizes in said body portion, and an abutment on each of the body portion and stem to limit inward movement of the stem into said body portion whereby at least one of said O-rings enters its cylindrical recess for a predetermined travel thereinto, the combination therewith of the improvement for enhancing safety of said blowpipe to reduce the danger of the stem being blown out by a backfire which improvement comprises means for locking the stem within the body portion in advance of engagement of said abutments and before at least one of said O rings has completed its predetermined travel, said locking means including a nut on said body portion and constituting a part of said quick detachable connection, said nut being provided with a conical cam surface directed inwardly at an angle ahead of the outlet end of said body to form therebetween an inner peripheral groove, said stem having a conical locking surface following said cylindrical portions having a longitudinal component greater than that of said groove and greater than the travel of said O-ring and a slope less than the angle of said cam surface, a toroidal spring adapted to abut the outlet end of said body and located in said groove longitudinally spaced along said body from the entrance for said O-ring for a distance longer than the longitudinal spacing of said abutment along said stem from said O-ring, whereby said toroidal spring may be forced into engagement with the outlet end of said body and be wedged against any intermediate diameter of said conical locking surface by tightening said nut after said O-ring has entered its recess and before said abutments have limited the travel of said O-ring.

2. In a blowpipe as claimed in claim 1, the provision of a shoulder on said stem following said conical locking surface, and a socket in the outer end of said nut for receiving said shoulder to conceal the same when the stem is in lockable position, but to expose a gap therebetween when the stem has not yet been inserted as fully as desired for safe gas-tight operation.

3. In a blowpipe as claimed in claim 1, the diameters of the cylindrical recesses and the O-rings receivable therein being such that the friction of said O-rings engaging the walls of their recesses in said body portion provide an operator with a warning that a position of lockability has been attained.

References Cited in the file of this patent

UNITED STATES PATENTS

| | | |
|---|---|---|
| 1,754,639 | Meyer | Apr. 15, 1930 |
| 1,867,296 | Woodruff | July 12, 1932 |
| 2,358,408 | McMurray | Sept. 19, 1944 |
| 2,434,426 | Muler | Jan. 13, 1948 |
| 2,455,544 | Yonkers | Dec. 7, 1948 |
| 2,579,314 | Grumblatt | Dec. 18, 1951 |
| 2,645,527 | Waters | July 14, 1953 |
| 2,672,924 | Anthes | Mar. 23, 1954 |
| 2,695,566 | Compton | Nov. 30, 1954 |

FOREIGN PATENTS

| | | |
|---|---|---|
| 1,034,886 | France | Apr. 15, 1953 |
| 1,086,073 | France | Aug. 4, 1954 |